J. R. STEELE.
NUT LOCK.
APPLICATION FILED JUNE 9, 1917.

1,262,991.

Patented Apr. 16, 1918.

Inventor
James R. Steele
By his Attorney

UNITED STATES PATENT OFFICE.

JAMES ROBERT STEELE, OF OWEGO, NEW YORK.

NUT-LOCK.

1,262,991.   Specification of Letters Patent.   Patented Apr. 16, 1918.

Application filed June 9, 1917. Serial No. 173,758.

*To all whom it may concern:*

Be it known that I, JAMES ROBERT STEELE, a citizen of the United States, and a resident of Owego, in the county of Tioga and State of New York, have invented a new and useful Nut-Lock, of which the following is a specification.

The invention is an improved nut-lock, suited especially for track-work, in which the locking is effected by the interaction of two nuts, and the object is to secure an effective, positive lock without the aid of special locking devices and one which is unaffected by stretching of the bolt.

Figure 1:
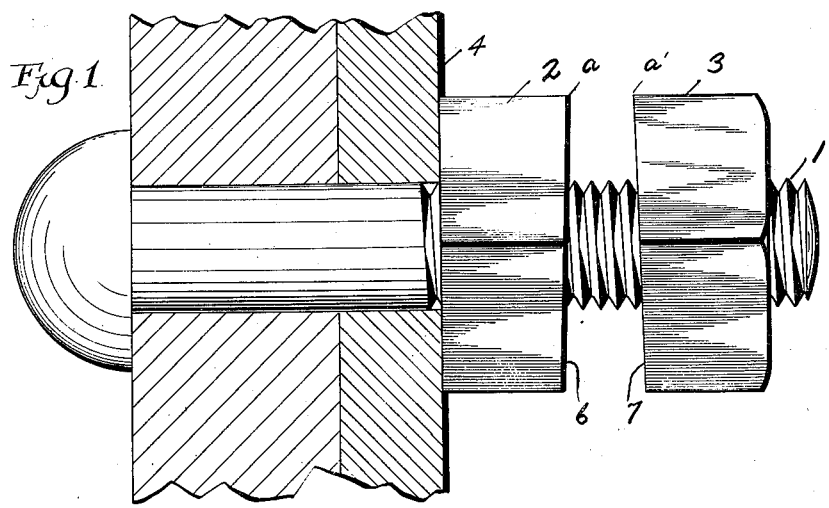
Figure 2:
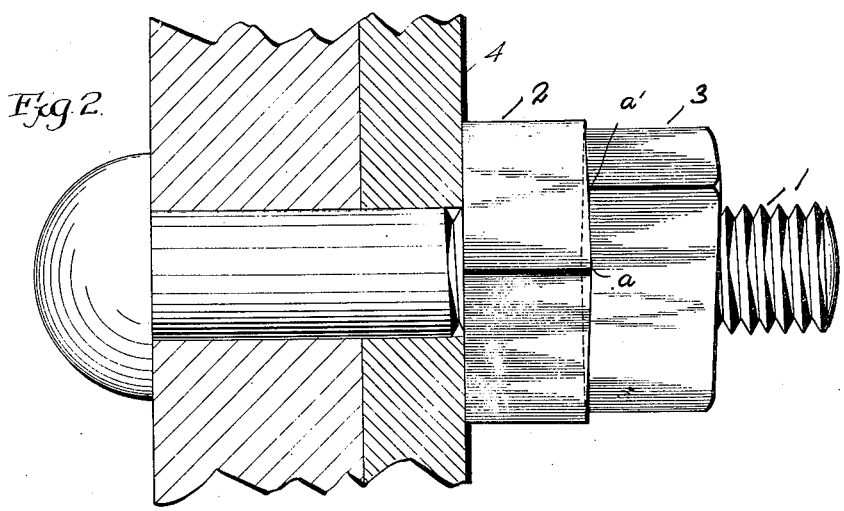
Figure 3:
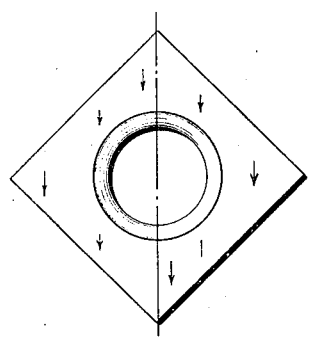

In the accompanying drawings:

Figure 1 may be termed a side view of the device, the first nut being screwed up against the base and the second nut being separated at a distance from the first;

Fig. 2 is a view looking at the high point of the first nut, the second nut being here shown as forced up tight; and Fig. 3 is a view looking at the inclined face of one of the nuts.

Upon the bolt 1 are placed two rigid nuts 2 and 3, both angular, and preferably, though not necessarily, square. The nut 2 has preferably a normal face at the side next the base 4. Its opposite face 5, however, is slightly inclined, and it is important to note that the slope extends from one of the angles or corners as the point of greatest prominence. This is indicated in Fig. 3 by the arrows, representing the direction of slope, the face corner $a$ being the point of greatest prominence. The second nut 3 has its inner face 7 similarly formed $a'$ being its high point. Both the sloping faces are plane.

The nut 2 is first screwed tight against the base. Then nut 3 is screwed up. The nuts touch first at one of the high corners, with elsewhere a gap between them of varying proportions. Continued forcible turning of the outer nut produces a canting of this nut upon the bolt, and if carried far enough will finally close the gap between the nuts, bringing the beveled faces flat together, after which the outer nut can be turned no farther. After the first contact, as the high point $a'$ approaches the high point $a$, resistance is encountered, canting the outer nut as described, and when the high point has passed, the resistance is less to forward turning but will increase if the bolt be turned backward. If the high point $a'$ is carried around again the resistance as it a second time approaches the point $a$ is still greater and the resistance to unscrewing after it has passed is correspondingly great. This resistance effectively prevents loosening of the nuts by vibration.

It is to be understood that more or less looseness exists between the threads of ordinary bolts and nuts, and the first effect of the canting of the outer nut is accordingly to tilt the threads of the nut upon the threads of the bolt so that they bind. Further forcing of the nut throws the parts in tension and may slightly deflect the bolt; but the construction is such as to avoid destroying the threads or exceeding the elastic limit of the metal, permanent distortion of the threads or bending of the bolt being undesired.

From the foregoing it will be perceived that in my nut-lock there is an elastic locking-by of two high corners, which in all cases positively prevents loosening of either nut by vibration. In no instance can the nuts be tightened and left in such relation that unscrewing is opposed only by frictional resistance.

What I claim as new is:

A nut-lock comprising two angular nuts on a bolt, said nuts being formed with plane opposed surfaces having direct contact with each other, each of said surfaces being inclined and sloping from an exterior corner as the point of greatest prominence, whereby the outer nut when screwed forcibly against the inner nut produces a canting and an elastic locking-by of the two high corners constituting a positive lock against unscrewing.

JAMES ROBERT STEELE.